United States Patent
Hashimoto et al.

[11] Patent Number: 6,110,009
[45] Date of Patent: Aug. 29, 2000

[54] GRINDING MACHINE FOR GRINDING FRICTIONAL SURFACE OF PAD AND METHOD OF GRINDING THE PAD

[75] Inventors: Yukio Hashimoto; Yukio Iwata; Nobuyuki Iwatate; Naozumi Kawanishi, all of Saitama, Japan

[73] Assignee: Akebono Brake Industry Co., Ltd., Tokyo, Japan

[21] Appl. No.: 08/748,717

[22] Filed: Nov. 14, 1996

[30] Foreign Application Priority Data

Nov. 16, 1995 [JP] Japan .................................... 7-298511
Nov. 16, 1995 [JP] Japan .................................... 7-298512

[51] Int. Cl.$^7$ .................................................. B24B 49/00
[52] U.S. Cl. ............................ 451/10; 451/11; 451/127; 451/136; 451/218; 451/69
[58] Field of Search .................................. 451/9, 10, 11, 451/28, 54, 65, 48, 69, 127, 70, 140, 136, 212, 215, 218, 221, 246

[56] References Cited

U.S. PATENT DOCUMENTS

| | | |
|---|---|---|
| 4,825,596 | 5/1989 | Kinner . |
| 4,864,779 | 9/1989 | Ozaki . |
| 5,193,314 | 3/1993 | Wormley et al. .......................... 451/11 |
| 5,231,861 | 8/1993 | Tokumura et al. . |
| 5,323,572 | 6/1994 | Guenin ..................................... 451/11 |
| 5,353,553 | 10/1994 | Miller . |
| 5,363,597 | 11/1994 | Gottschald et al. ...................... 451/69 |

*Primary Examiner*—Eileen Morgan
*Attorney, Agent, or Firm*—Finnegan, Henderson, Farabow, Garrett & Dunner, L.L.P.

[57] ABSTRACT

The grinding machine for grinding a frictional surface of a pad of the present invention comprises: a grooving cutter to be rotated; a cylindrical grinding wheel arranged at a position distant from the grooving cutter; a pad chucking portion for holding a frictional surface of the brake pad so that the frictional surface can be opposed to the outer circumferential surface of the cylindrical grinding wheel; an X-axis feed mechanism for advancing and retreating the pad chucking portion in the direction of X-axis parallel to the frictional surface of the brake pad; a Y-axis feed mechanism for advancing and retreating the pad chucking portion in the direction of Y-axis perpendicular to the frictional surface of the brake pad; a Z-axis rotation mechanism for rotating the brake pad around the Z-axis perpendicular to the frictional surface of the brake pad; and a numerically controlling circuit for controlling the motions conducted by the above mechanisms.

18 Claims, 7 Drawing Sheets

GRINDING MACHINE FOR GRINDING FRICTIONAL SURFACE OF PAD AND METHOD OF GRINDING THE PAD

BACKGROUND OF THE INVENTION

1. Field of the Invention

The present invention relates to a grinding machine for grinding a frictional surface of a pad and also relates to a method of grinding the pad, in which a frictional surface of a substantially plate-shaped brake pad is ground so as to finish the brake pad to be a predetermined size and shape.

2. Description of the Related Art

Conventionally, a brake pad, for example, a brake pad used for a disk brake of an automobile is formed into a predetermined size and shape through the following processes. In a preforming process, base material, in which various granular and fibrous components are uniformly mixed, is compressed and formed into a predetermined size and shape with a preforming metallic mold. Subsequently, the preform is subjected to a heat forming process at a predetermined pressure and temperature using a heat forming metallic mold, so that it can be formed into a predetermined size and shape. Then, the heat formed object is cooled to a predetermined temperature. After cooling, the heat formed object is subjected to coating, grinding and chamfering if necessary.

FIGS. 10 and 11 are views showing the structure of a brake pad 1 that has completed the above cooling process.

The brake pad 1 includes: a frictional lining 2 and a back plate 3 fixed onto a reverse side of the friction lining 2. An overall shape of the brake pad 1 is substantially plain. In this brake pad 1, a surface of the friction lining 2 is a frictional surface 4 that is pressed against a brake disk so as to generate a brake force.

In this connection, components of the base material to compose the friction lining are: fibrous reinforcement composed of metallic fibers, inorganic fibers or organic fibers; a binder composed of thermosetting resin; and various additional agents such as a friction modifier or lubricant. In accordance with the physical property required for the friction lining, a compounding ratio of the components is appropriately adjusted.

The brake pad 1 shown in FIGS. 10 and 11 is subjected to grinding process in the finishing process conducted later, and as shown in FIGS. 12 and 13, when necessary, the frictional surface 4 is ground, both end portions 5 are chamfered, and the groove 6 used for radiation and drainage is formed. In this way, the brake pad 1 is finished to be a predetermined size and shape.

In this connection, an inclination angle, thickness t of the friction lining 2, provision or non-provision of the groove 6 and depth of the groove 6 are appropriately changed in accordance with the brake property required for a vehicle. According to the conventional method, grinding of the frictional surface, chamfering the end portions and grooving are respectively conducted in the different processes with different exclusive tools.

That is, both end portions 5 are chamfered in such a manner that several types of grinding tools (grinding wheels), the tool angles of which are different, are prepared in accordance with the number of inclination angles of chamfering, and that chamfering is conducted on the end portion with a predetermined tool. After that, in the process of grooving, the tool is replaced with a grooving cutter, so that the groove 6 is formed. After the formation of the groove 6 has been completed, the frictional surface 4 is ground with a tool for grinding a plane.

However, in the grinding process described above, the following problems may be encountered. When grooving is started after chamfering has been completed, or alternatively when grinding of frictional surface 4 is started after grooving has been completed, or when grinding of frictional surface is started after chamfering has been completed (in the case of non-provision of the groove), it is necessary to replace the tool every time. Moreover, even when the inclination angle of chamfering is changed, it is necessary to replace the tool. Since the tool must be frequently changed, the productivity is remarkably lowered. Therefore, it is impossible to apply the conventional grinding process to the system of small-lot production in which various types of products are produced.

In order to carry out grinding the frictional surface 4, chamfering and grooving, several passes of processing are required. In accordance with an increase in the number of grinding passes, productivity is greatly deteriorated.

Further, the number of types of tools to be prepared is increased, which increases the cost of tools. Furthermore, it takes time and labor to manage various types of tools. As a result, the manufacturing cost of pads is raised.

SUMMARY OF THE INVENTION

The present invention has been accomplished in view of the above problems. It is an object of the present invention to provide a grinding machine for grinding a frictional surface of a pad and also to provide a method of grinding the pad characterized in that: the frictional surface of a brake pad can be ground and the end portion can be chamfered with a single tool so that no tools are replaced; and all process including grooving can be completed in one pass. Accordingly, the productivity can be greatly enhanced and the manufacturing cost can be lowered, and it is possible to apply the grinding machine and grinding method of the present invention to the system of small-lot production in which various types of products are produced.

According to a first aspect of the present invention, a grinding machine for grinding a frictional surface of a brake pad being substantially plate-shaped so as to finish the brake pad to a predetermined size and shape, comprises: a cylindrical grinding wheel to be rotated; a pad chucking portion for holding the brake pad so that the frictional surface of the brake pad can be opposed to an outer circumferential surface of the cylindrical grinding wheel; an X-axis feed mechanism for advancing and retreating the pad chucking portion in a direction of an X-axis perpendicular to a rotational axis of the cylindrical grinding wheel and parallel to the frictional surface of the brake pad; a Y-axis feed mechanism for advancing and retreating the pad chucking portion in a direction of a Y-axis perpendicular to the frictional surface of the brake pad; and a numerically controlling circuit for controlling feed motions conducted by the X-axis feed mechanism and Y-axis feed mechanism in accordance with an inputted numerical data.

According to a second aspect of the invention, a method of grinding a brake pad for finishing a frictional surface of the brake pad to a predetermined size and shape comprises the steps of: feeding the brake pad to a grinding member for grinding the frictional surface from a first end of the frictional surface to be chamfered; keeping the brake pad away from the grinding member gradually during the feeding step, so that an amount of grinding in a thickness direction of the brake pad is gradually reduced to chamfer the first end of the the frictional surface; grinding the frictional surface during the feeding step; stopping the keeping away step during the grinding and feeding steps; and bringing the brake pad close to the grinding member gradually during the grinding and feeding steps, so that the amount of grinding in the thickness direction of the brake pad is gradually increased in a second end of the frictional surface to chamfer thereof.

DETAILED DESCRIPTION OF THE PREFERRED EMBODIMENTS

Referring to the accompanying drawings, the preferred embodiment of the grinding machine for grinding a frictional surface of a pad of the present invention will be explained in detail as follows.

Figure 1:
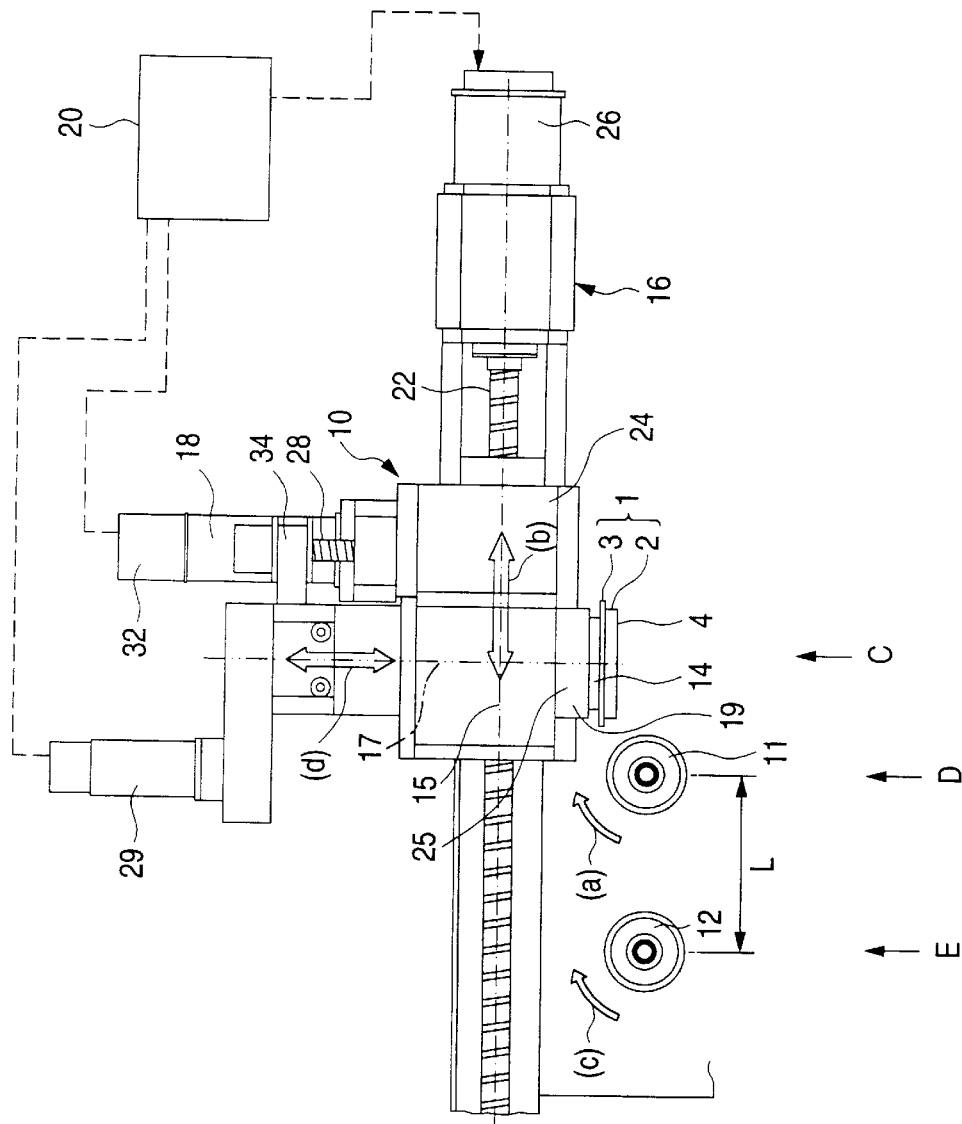
FIG. 1 is an arrangement view showing an outline of the grinding machine for grinding a frictional surface of a pad of the present invention.

FIG. 1 is an arrangement view showing an outline of the grinding machine for grinding a frictional surface of a pad of the present invention.

Figure 8:
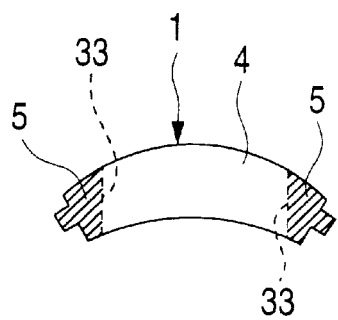
FIGS. 8(a) and 8(b) are front views of the pad showing a state of chamfering.
Figure 8:
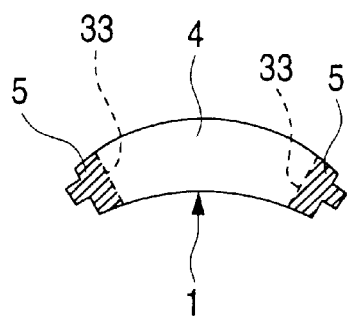
Figure 9:
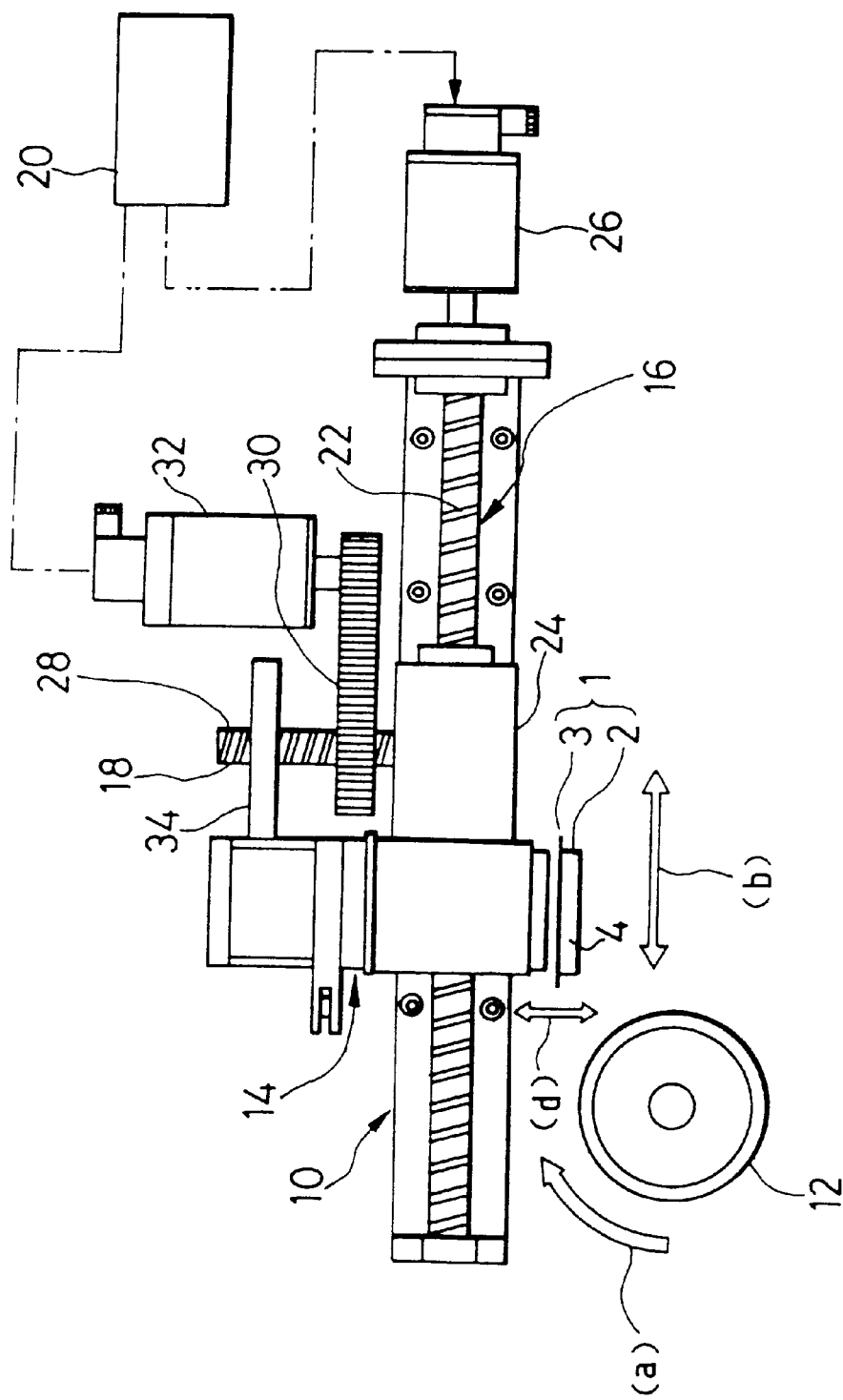
FIG. 9 is an another embodiment the grinding machine.
Figure 10:
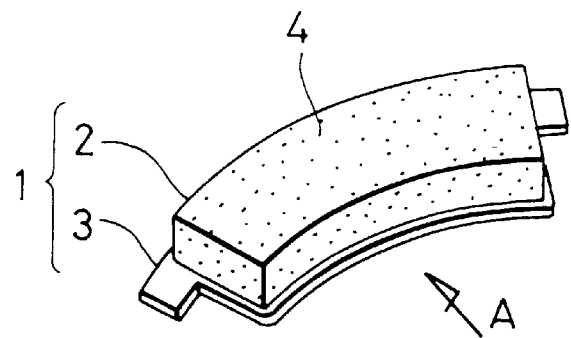
FIG. 10 is a perspective view of the brake pad formed into a predetermined shape by means of heat forming process.
Figure 11:
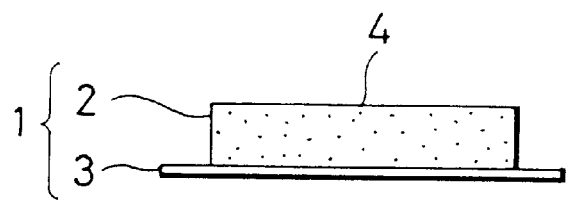
FIG. 11 is a view taken in the direction of arrow A in FIG. 8.
Figure 12:
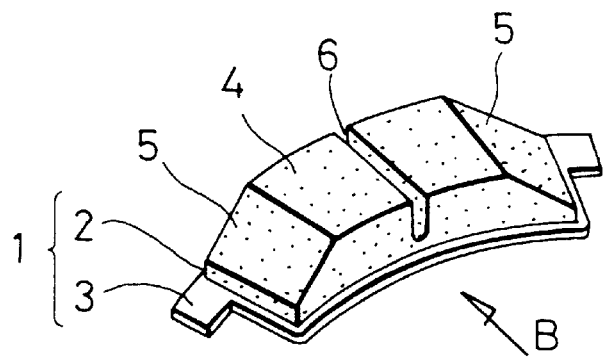
FIG. 12 is a perspective view of the brake pad that has been processed by means of grinding.
Figure 13:
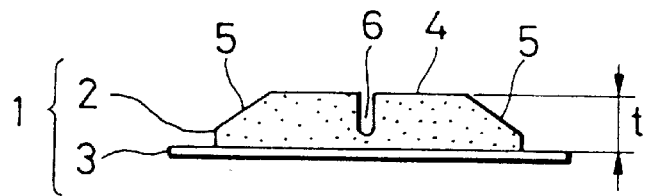
FIG. 13 is a view taken in the direction of arrow B in FIG. 12.

By this grinding machine for grinding a frictional surface of a pad of this embodiment, the frictional surface of the substantially plate-shaped brake pad shown in FIGS. 8 and 9 is ground and finished to be a predetermined size and shape. Accordingly, like reference characters are used to indicate like parts in the views, and explanations are simplified.

As explained before, the brake pad 1 includes: a friction lining 2 formed by means of compressing base material; and a back plate 3 fixed onto a reverse side of the friction lining 2. In this brake pad 1, a surface of the friction lining 2 is a frictional surface 4 that is pressed against a brake disk so as to generate a brake force.

In this connection, components of the base material to compose the friction lining: reinforcing fibers composed of metallic fibers, inorganic fibers or organic fibers; a binder composed of thermosetting resin powder; and various addition agents such as a friction modifier or lubricant. In accordance with the physical property required for the friction lining, a compounding ratio of the components is appropriately adjusted in the same manner as described before.

As shown in FIG. 1, the grinding machine 10 for grinding a frictional surface of a pad of this embodiment includes: a disk-shaped grooving cutter 11 rotated clockwise (direction of arrow "a") at a constant position; a cylindrical grinding wheel 12 for grinding a plane, which is rotated clockwise (direction of arrow "c") and arranged at a position distant from the grooving cutter 11 by a predetermined distance; a pad chucking portion 14 for holding the brake pad 1 in such a manner that the frictional surface 4 of the brake pad 1 can be opposed to the outer circumferential surfaces of the cylindrical grinding wheel 12 and the grooving cutter 11; an X-axis feed mechanism 16 for advancing and retreating the pad chucking portion 14 in the direction of the X-axis (direction of arrow "b"); a Y-axis feed mechanism 18 for advancing and retreating the pad chucking portion 14 in the direction of the Y-axis (direction of arrow "d") perpendicular to the frictional surface 4 of the brake pad 1; a Z-axis rotation mechanism 19 for rotating the brake pad 1 mounted on the pad chucking portion 14 around the Z-axis 17 perpendicular to the frictional surface 4 of the brake pad 1; and a numerically controlling circuit 20 for controlling the rotating motion conducted by the Z-axis rotation mechanism 19 and the feed motions conducted by the X-axis feed mechanism 16 and the Y-axis feed mechanism 18 in accordance with the inputted numerical data.

The pad chucking portion 14 attracts a back plate 3 of the brake pad 1 by the magnetic force of a magnet not shown, so that the brake pad 1 can be held and fixed to the pad chucking portion 14.

The direction of the X-axis 15 is perpendicular to the rotational axes of the cylindrical grinding wheel 12 and the grooving cutter 11 and parallel to the frictional surface 4 of the brake pad 1.

The rotational axis of the cylindrical grinding wheel 12 is parallel to that of the grooving cutter 11. A distance between the rotational axis of the cylindrical grinding wheel 12 and that of the grooving cutter 11 is a predetermined value L, wherein the cylindrical grinding wheel 12 and grooving cutter 11 are arranged on a straight line parallel to the frictional surface 4 of the brake pad 1.

In this case, the predetermined distance L is determined so that the brake pad 1 can not interfere with the cylindrical grinding wheel 12 and the grooving cutter 11 when the brake pad 1 is rotated by the Z-axis rotation mechanism 19.

The X-axis feed mechanism 16 includes: a ball screw shaft 22 arranged in the direction of the X-axis shown by the arrow "b"; a movable block 24 screwed to the ball shaft 22, moving on the ball shaft 22 in accordance with the rotation of the ball shaft 22; and a servomotor 26 used for the X-axis to rotate the ball shaft 22 in accordance with a control signal sent from the numerically controlling circuit 20.

The movable block 24 supports a substantially cylindrical rotating shaft 25 in such a manner that the substantially cylindrical rotating shaft 25 can be freely moved only in the direction of the Y-axis shown by the arrow "d" in FIG. 1. By the action of the rotating shaft 25, the pad chucking portion 14 can be rotated around the Z-axis 17.

The Y-axis feed mechanism 18 includes: a ball screw shaft 28 rotatably supported by the movable block 24, wherein an axis of the ball screw shaft 28 is arranged in the same direction as that of the Y-axis shown by the arrow "d"; and a servomotor 32 used for the Y-axis to rotate the ball screw shaft 28 in accordance with a control signal sent from the numerically controlling circuit 20, wherein a support arm 34 extending from the pad chucking portion 14 is screwed to the ball screw shaft 28. When the ball screw shaft 28 is rotated, the pad chucking portion 14 integrated with the support arm 34 is advanced and retreated on the ball screw shaft 28 in accordance with the rotation of the ball screw shaft 28.

Figure 2:
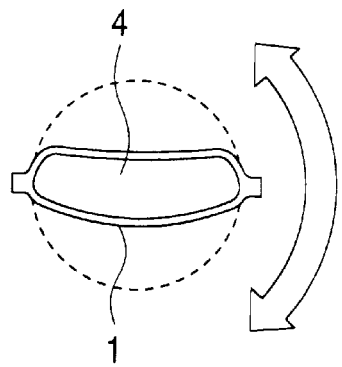
FIG. 2 is a view taken in the direction of arrow C in FIG. 1.

The Z-axis rotation mechanism 19 includes: a servomotor 29 used for the Z-axis, the motion of which is controlled by a control signal sent from the numerically controlling circuit 20; and a rotation shaft 25 rotated by the servomotor 29 used for the Z-axis. As shown in FIG. 2, the brake pad 1 is rotated around the Z-axis 17 by an amount of rotation of the rotation shaft 25 which supports the pad chucking portion 14 so that it can be moved only in the direction of the Z-axis 17.

According to the above arrangement of the grinding machine 10 for grinding a frictional surface of a pad, it is possible to continuously carry out in one pass both the cutting process conducted by the grooving cutter 11 by which a groove is formed on the frictional surface 4 of the brake pad 1 and the grinding process conducted by the cylindrical grinding wheel 12 by which an end portion of the frictional surface 4 is chamfered and a plane of the frictional surface is ground.

In these cutting processes conducted by the grooving cutter and grinding process conducted by the cylindrical grinding wheel, when an amount of the feed conducted by the Y-axis feed mechanism 18 is set at an appropriate value, an amount of grinding of the brake pad 1 in the thickness direction can be set. When an amount of the feed conducted by the X-axis feed mechanism 16 is set at an appropriate value, a range of grinding of the brake pad 1 in the surface direction can be arbitrarily set. Further, when an amount of rotation conducted by the Z-axis rotation mechanism 19 is set at an appropriate value, a direction of grinding on the frictional surface 4 can be set at an angle.

Figure 3:
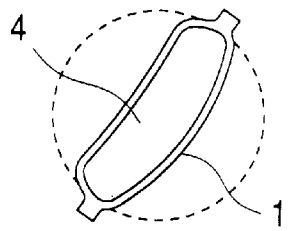
FIG. 3 is a front view of the pad showing the adjustment of direction conducted by the Z-axis rotation mechanism before the start of the grooving cutter.
Figure 4:
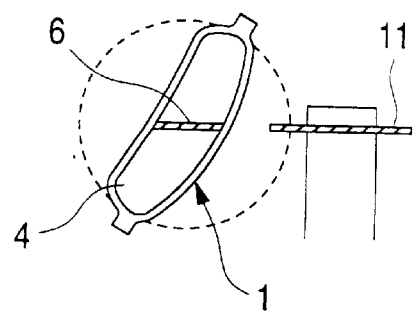
FIG. 4 is a view taken in the direction of arrow D in FIG. 1, that is, a front view of the pad in which the grooving cutter is shown after it has completed cutting operation of grooving.

As shown in FIG. 3, in the cutting process conducted by the grooving cutter, a direction of the frictional surface 4 is previously adjusted by the Z-axis rotation mechanism 19 so that the direction of the groove 6 to be formed on the frictional surface of the brake pad 1 can coincide with the direction of grinding the grooving cutter 11. At the same time, an amount of the feed conducted by the Y-axis feed mechanism 18 is adjusted so that the depth of the groove formed by the grooving cutter 11 can be a predetermined value. After the above adjustment has been completed, the X-axis feed mechanism 16 carries out the feeding operation so that the grooving cutter 11 can cross the frictional surface 4. Due to the foregoing, as shown in FIG. 4, it is possible to form a groove 6, the angle of which is an arbitrary value, and the depth of which is a predetermined value, on the frictional surface 4 of the brake pad 1.

Figure 5:
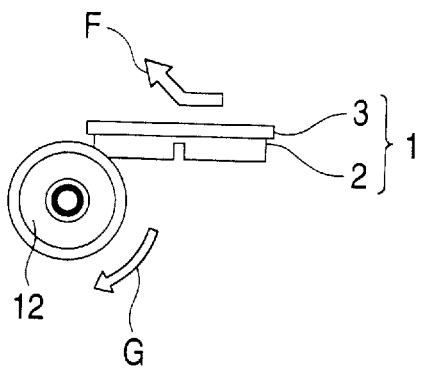
FIGS. 5(a) to 5(d) are schematic illustrations showing a positional relation between the cylindrical grinding wheel and the brake pad in the grinding process of one pass conducted by the grinding machine for grinding a frictional surface of a pad illustrated in FIG. 1.
Figure 5:
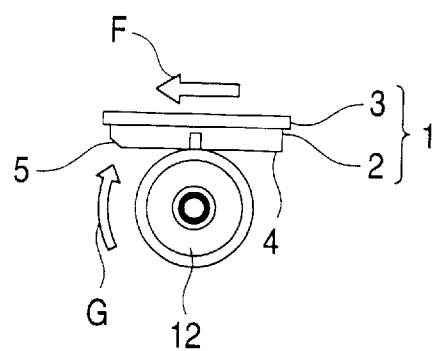
Figure 5:
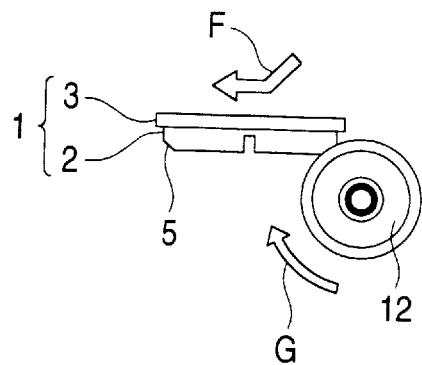
Figure 5:
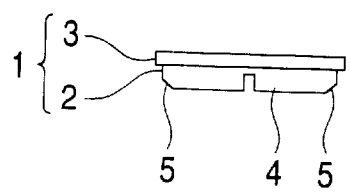
Figure 6:
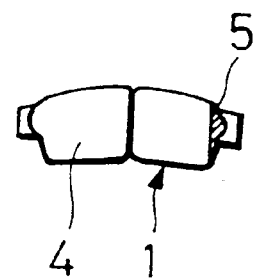
FIGS. 6(a) to 6(d) are plan views showing a range of grinding conducted on the brake pad corresponding to FIGS. 5(a) to 5(d)
Figure 6:
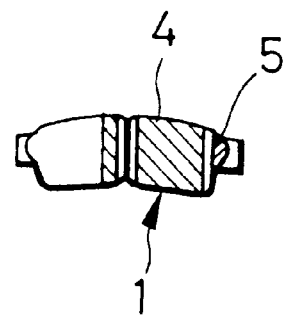
Figure 6:
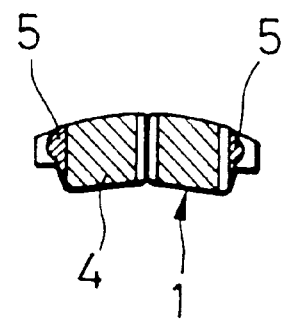
Figure 6:
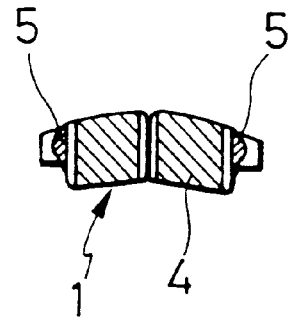

In the grinding process conducted by the cylindrical grinding wheel, as shown in FIGS. 5(a) and 6(a), the feed operation is conducted by both the X-axis feed mechanism 16 and the Y-axis feed mechanism 18 so that an amount of grinding in the thickness direction of the brake pad 1 can be gradually reduced in the beginning of grinding of one pass conducted by the cylindrical grinding wheel; as shown in FIGS. 5(b) and 6(b), the feed operation conducted by the Y-axis feed mechanism 18 is stopped and only the feed operation conducted by the X-axis feed mechanism 16 is advanced in the middle of grinding of one pass conducted by the cylindrical grinding wheel; and as shown in FIGS. 5(c) and 6(c), the feed operation is conducted by both the X-axis feed mechanism 16 and the Y-axis feed mechanism 18 so that an amount of grinding in the thickness direction of the brake pad 1 can be gradually increased in the end of grinding of one pass conducted by the cylindrical grinding wheel.

In this connection, all arrows F show the directions of movement of the brake pad 1 conducted by the X-axis feed mechanism 16 and the Y-axis feed mechanism 18, and arrow G shows the direction of rotation of the cylindrical grinding wheel 12. In FIG. 3, a region on the pad which has been ground is shown by hatching. FIGS. 5(d) and 6(d) show a condition in which the grinding machine 10 has completed the grinding operation.

According to the arrangement described above, the cutting process conducted by the grooving cutter and the grinding process conducted by the cylindrical grinding wheel can be continuously carried out in one pass. When amounts of feed conducted by the X-axis feed mechanism 16 and the Y-axis feed mechanism 18 and an amount of rotation conducted by the Z-axis rotation mechanism 19 are appropriately set in the cutting process conducted by the grooving cutter and the grinding process conducted by the cylindrical grinding wheel, it is possible to grind the brake pad 1 with a single tool without replacing the tool for grinding the frictional surface 4 of the pad and chamfering the end portion 5. Moreover, grinding and grooving can be completed in one pass. Accordingly, the productivity can be greatly enhanced.

Even in the case of small-lot production in which various types of products are produced, for example, even when the inclination angle of chamfering and the thickness of the brake pad 1 are changed, it is not necessary to prepare various types of tools, and production can be accomplished with a single cylindrical grinding wheel 12. Accordingly, the manufacturing cost can be lowered, and it is possible to apply the grinding machine of the present invention to the system of small-lot production in which various types of products are produced.

Moreover, motions of the X-axis feed mechanism 16, Y-axis feed mechanism 18 and Z-axis rotation mechanism 19 are controlled by the numerically controlling circuit 20 under the condition of three axis numerical control. Accordingly, only when the numerical data to be inputted into the numerically controlling circuit 20 is changed, the inclination angle of chamfering, the thickness of the pad and the depth and direction of the groove can be easily changed. Therefore, the grinding machine of the invention can be easily applied to the system of small-lot production in which various types of products are produced.

Figure 7:
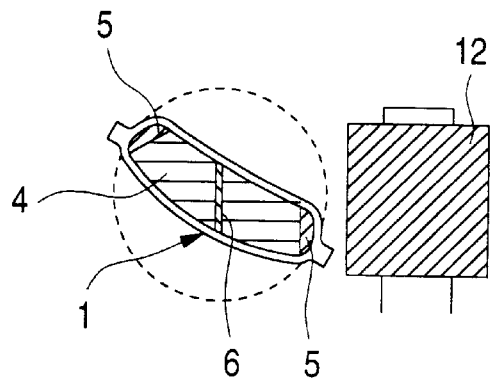
FIG. 7 is a view taken in the direction of arrow E in FIG. 1, that is, a front view of the pad in which the groove cutter is shown after it has completed cutting operation of grooving.

As shown in FIG. 7, when a direction of the brake pad 1 advancing to the cylindrical grinding wheel 12 is appropriately set by the rotational operation of the Z-axis rotation mechanism 19 at the start of grinding conducted by the cylindrical grinding wheel 12, it is possible to chamfer both end portions 5 so that the upper edges 33 of both end portions 5 can be arranged in parallel to each other as shown in FIG. 8(a). Also, it is possible to chamfer the end portions 5 in such a manner that the upper edges 33 are open upward as shown in FIG. 8(b). Therefore, the degree of freedom of grinding can be enhanced.

In this connection, in the above embodiment, the cylindrical grinding wheel 12 is rotated at a constant position, and the pad chucking portion 14 can be moved with respect to the cylindrical grinding wheel 12 in the two directions of the X-axis and the Y-axis. However, the present invention is not limited to the specific embodiment. The pad chucking portion 14 may be fixed at a constant position, and the cylindrical grinding wheel 12 may be moved in the two directions of the X-axis and the Y-axis.

Further, FIG. 9 shows another embodiment of the present invention. This grinding machine is used for only grinding a frictional surface of a pad and provides the pad with no groove, so that the Z-axis rotation mechanism and disk-shaped grooving cutter 11 are omitted. And the Y-axis feed mechanism 18 is driven via a rotational transmission system 30. Other parts are almost same as that of the preceding embodiments, so that this embodiment performs the same grinding process such as the preceding embodiment.

As described above, according to the grinding machine for grinding a frictional surface of a pad of the present invention, it is possible to continuously carry out in one pass both the cutting process conducted by the grooving cutter by which a groove is formed on the frictional surface of the brake pad and the grinding process conducted by the cylindrical grinding wheel by which an end portion of the frictional surface is chamfered and a plane of the frictional surface is ground.

In these cutting processes conducted by the grooving cutter and grinding process conducted by the cylindrical grinding wheel, when an amount of the feed conducted by the Y-axis feed mechanism is set at an appropriate value, an amount of grinding of the brake pad in the thickness direction can be set. When an amount of the feed conducted by the X-axis feed mechanism is set at an appropriate value, a range of locations for grinding the brake pad in the surface direction can be arbitrarily set. Further, when an amount of rotation conducted by the Z-axis rotation mechanism is set at an appropriate value, a direction of grinding on the frictional surface can be set at an angle.

In the cutting process conducted by the grooving cutter, a direction of the frictional surface is previously adjusted by the Z-axis rotation mechanism so that the direction of the groove to be formed on the frictional surface of the brake pad can coincide with the direction of grinding the grooving cutter. At the same time, an amount of the feed conducted by the Y-axis feed mechanism is adjusted so that the depth of the groove formed by the grooving cutter can be a predetermined value. After the above adjustment has been completed, the X-axis feed mechanism carries out the feeding operation so that the grooving cutter can cross the frictional surface. Due to the foregoing, it is possible to form a groove, the angle of which is an predetermined value, and the depth of which is also a predetermined value, on the frictional surface of the brake pad.

In the grinding process conducted by the cylindrical grinding wheel, the brake pad is fed to the cylindrical grinding wheel from one end of the frictional surface to be chamfered; feeding operation is conducted by both the X-axis feed mechanism and the Y-axis feed mechanism so that an amount of grinding in the thickness direction of the brake pad can be gradually reduced in the beginning of grinding conducted by the cylindrical grinding wheel; the feed operation conducted by the Y-axis feed mechanism is stopped and the feed operation conducted by the X-axis feed mechanism is advanced in the middle of grinding conducted by the cylindrical grinding wheel; and feeding operation is conducted by both the X-axis feed mechanism and the Y-axis feed mechanism so that an amount of grinding in the thickness direction of the brake pad can be gradually increased in the end of grinding conducted by the cylindrical grinding wheel. Due to the foregoing, a corner of the end portion of the frictional surface can be chamfered at an arbitrary angle, and the frictional surface can be uniformly ground and the thickness of the brake pad can be finished to be an arbitrary value.

According to the arrangement described above, the cutting process conducted by the grooving cutter and the grinding process conducted by the cylindrical grinding wheel can be continuously carried out in one pass. When amounts of feed conducted by the X-axis feed mechanism and the Y-axis feed mechanism and an amount of rotation conducted by the Z-axis rotation mechanism are appropriately set in the cutting process conducted by the grooving cutter and the grinding process conducted by the cylindrical grinding wheel, it is possible to grind the brake pad with a single tool without replacing the tool for grinding the frictional surface of the pad and chamfering the end portion. Moreover, grinding and grooving can be completed in one pass. Accordingly, the productivity can be greatly enhanced.

Even in the case of small-lot production in which various types of products are produced, for example, even when the inclination angle of chamfering and the thickness of the brake pad are changed, it is not necessary to prepare various types of tools, and production can be accomplished with a single cylindrical grinding wheel. Accordingly, the manufacturing cost can be lowered, and it is possible to apply the grinding machine of the present invention to the system of small-lot production in which various types of products are produced.

Moreover, motions of the X-axis feed mechanism, Y-axis feed mechanism and Z-axis rotation mechanism are controlled by the numerically controlling circuit under the condition of three axis numerical control. Accordingly, only when the numerical data to be inputted into the numerically controlling circuit is changed, the inclination angle of chamfering, the thickness of the pad and the depth and direction of the groove can be easily changed. Therefore, the grinding machine of the invention can be easily applied to the system of small-lot production in which various types of products are produced.

What is claimed is:

1. A grinding machine for grinding a frictional surface of a brake pad being substantially plate-shaped so as to finish the brake pad to a predetermined size and shape, comprising:

a cylindrical grinding wheel capable of rotating about a rotational axis;

a pad chucking portion for holding the brake pad such that the frictional surface of the brake pad faced an outer circumferential surface of the cylindrical grinding wheel;

an X-axis feed mechanism for advancing and retreating the pad chucking portion along an X-axis direction perpendicular to the rotational axis of the cylindrical grinding wheel and parallel to a longitudinal axis of the frictional surface of the brake pad;

a Y-axis feed mechanism for advancing and retreating the pad chucking portion along a Y-axis direction perpendicular to the longitudinal axis of the frictional surface of the brake pad;

a numerical control device configured for controlling feed motions of the pad chucking portion conducted by the X-axis and the Y-axis feed mechanisms in accordance with inputted numerical data so as to selectively move the pad chucking portion along the X-axis and Y-axis directions to thereby chamfer at least one end portion of the frictional surface of the brake pad, and selectively continue to move the pad chucking portion along the X-axis direction to thereby grind the frictional surface into a plane parallel to the longitudinal axis of the frictional surface of the brake pad while the pad chucking portion is prevented from moving relative to the Y-axis direction.

2. The grinding machine for grinding a frictional surface of a pad according to claim 1, further comprising:

a disk-shaped grooving cutter capable of rotating about a rotational axis extending parallel to the rotational axis of the cylindrical grinding wheel, the disk-shaped grooving cutter being arranged at a position spaced from the cylindrical grinding wheel by a predetermined distance in the direction of the X-axis; and a Z-axis rotation mechanism for rotating the brake pad around a Z-axis perpendicular to the plane defined by the frictional surface of the brake pad;

wherein the numerical control device further controls a rotational motion conducted by the Z-axis rotation mechanism.

3. The grinding machine for grinding a frictional surface of a pad according to claim 1, wherein the pad chucking portion selectively attracts a back plate of the brake pad by a magnetic force so as to fixedly hold the brake pad.

4. The grinding machine for grinding a frictional surface of a pad according to claim 1, wherein the X-axis and Y-axis feed mechanisms are configured to simultaneously conduct feed motions while chamfering the at least one selected end portion of the frictional surface of the brake pad, and the Y-axis feed mechanism is configured to selectively stop motion of the pad chucking portion along the direction of the Y-axis while the X-axis feed mechanism moves the pad chucking portion along the direction of the X-axis and the frictional surface of the brake pad is being grinded into the plane by the outer circumferential surface of the cylindrical grinding wheel.

5. The grinding machine for grinding a frictional surface of a pad according to claim 1, wherein the numerical control unit is configured to control the X-axis and Y-axis feed mechanisms so as to selectively fix movement of the pad chucking portion relative to a direction of movement parallel to the X-axis and the Y-axis directions.

6. A method of grinding a brake pad for finishing a frictional surface of the brake pad to a predetermined size and shape comprising the steps of:

feeding the brake pad toward a grinding member so as to selectively grind and chamfer the frictional surface of the brake pad;

selectively moving the brake pad along an X-axis direction parallel to a longitudinal axis of the frictional surface of the brake pad and along a Y-axis direction perpendicular to the X-axis direction during the step of feeding so as to chamfer a first end portion of the frictional surface of the brake pad;

moving the brake pad along the X-axis direction during the step of feeding so as to grind the frictional surface to a plane parallel to the longitudinal axis of the frictional surface of the brake pad; and selectively moving the brake pad along the X-axis and Y-axis directions during the step of feeding so as to form a chamfer at a second end portion of the frictional surface of the brake pad.

7. The grinding machine of claim 1, wherein the at least one selected end portion of the frictional surface of the brake pad comprises first and second outermost end portions.

8. The method of claim 6, further comprising the step of feeding the brake pad to a grooving cutter for forming a groove on the frictional surface of the brake pad, the groove defining a longitudinal axis extending substantially perpendicular to the longitudinal axis of the frictional surface of the brake pad.

9. The method of claim 6, further comprising the step of forming a groove on the frictional surface of the brake pad, the groove defining a longitudinal axis extending substantially perpendicular to the longitudinal axis of the frictional surface of the brake pad.

10. The method of claim 6, further comprising the steps of selectively adjusting an orientation of the frictional surface of the brake pad relative to a longitudinal axis of a groove cutter and forming a groove on the frictional surface of the brake pad such that a longitudinal axis of the groove forms a selected angle relative to the longitudinal axis of the frictional surface of the brake pad.

11. The method of claim 6, further comprising the step of moving the frictional surface of the brake pad toward a groove cutter and to a predetermined vertical position so as to form a groove in the frictional surface of the brake pad, the groove having a depth corresponding to the predetermined vertical position.

12. A method a grinding a peripheral surface of a brake pad to a predetermined size and shape, comprising:

rotating a grinding wheel about a rotational axis;

holding the brake pad such that the peripheral surface of the brake pad faces a first direction and is opposed to an outer circumferential surface of the grinding wheel;

selectively advancing and retreating the brake pad along an X-axis direction perpendicular to the rotational axis of the grinding wheel and parallel to a longitudinal axis of the peripheral surface of the brake pad such that the grinding wheel selectively grinds the peripheral surface of the brake pad in the X-axis direction;

selectively advancing and retreating the brake pad along a Y-axis direction perpendicular to the X-axis direction and perpendicular to the longitudinal axis of the peripheral surface of the brake pad such that the grinding wheel selectively grinds the peripheral surface of the brake pad in the Y-axis direction; and controlling the steps of selectively advancing and retreating of the brake pad along the X-axis and Y-axis directions in accordance with inputted data so as to selectively move the brake pad along the X-axis and Y-axis directions to chamfer at least one end portion of the peripheral surface of the brake pad, and selectively move the brake pad along the X-axis direction to grind the peripheral surface into a plane parallel to the longitudinal axis of the peripheral surface of the brake pad while the brake pad is prevented from moving along the Y-axis direction.

13. The method of claim 12, further comprising the step of selectively attracting a back plate of the brake pad to a pad chucking portion so as to fixedly hold the brake pad to the pad chucking portion.

14. The method of claim 12, further comprising the step of selectively preventing the brake pad from moving along the Y-axis direction so as to grind the peripheral surface into the plane parallel to the longitudinal axis of the peripheral surface of the brake pad.

15. The method of claim 12, further comprising the steps of:

rotating a groove cutter having a longitudinal axis about a rotational axis extending parallel to the rotational axis of the cylindrical grinding wheel;

rotating the brake pad around a Z-axis perpendicular to the longitudinal axis of the peripheral surface of the brake pad; and controlling the rotational motion of the brake pad around the Z-axis so as to selectively adjust an orientation of the peripheral surface of the brake pad relative to the longitudinal axis of the groove cutter and form a groove on the peripheral surface of the brake pad such that a longitudinal axis of the groove forms a selected angle relative to the longitudinal axis of the peripheral surface of the brake pad.

16. The method of claim 12, further comprising the step of forming a groove on the peripheral surface of the brake pad before forming a chamfer on the at least one end portion of the peripheral surface of the brake pad while moving the brake pad along the X-axis direction.

17. The method of claim 12, further comprising the steps of:

moving the brake pad toward a groove cutter;

forming a groove on the peripheral surface of the brake pad;

moving the brake pad along the X-axis and Y-axis directions so as to engage the grinding wheel after the step of forming the groove;

forming a first chamfer on a first end portion of the peripheral surface of the brake pad while the brake pad selectively moves along the X-axis and Y-axis directions;

grinding the peripheral surface of the brake pad into a substantially linear portion extending parallel to the X-axis direction while the brake pad selectively moves along the X-axis direction and is fixed relative to the Y-axis direction; and forming a second chamfer on a second end portion of the peripheral surface of the brake pad after the step of grinding the peripheral surface while the brake pad continues to move along the X-axis direction and is selectively moved along the Y-axis direction.

18. A method a grinding a frictional surface of a brake pad to a predetermined size and shape, comprising moving the brake pad toward a groove cutter;

forming a groove on the frictional surface of the brake pad;

moving the brake pad along the X-axis direction parallel to a longitudinal axis of the frictional surface and Y-axis direction perpendicular to the longitudinal axis of the frictional surface so as to engage a grinding wheel after the step of forming the groove;

selectively moving the brake pad along the X-axis and Y-axis directions so as to form a first chamfer on a first end portion of the peripheral surface of the brake pad;

selectively moving the brake pad along the X-axis direction so as to grind the peripheral surface of the brake pad into a substantially linear portion extending parallel to the X-axis direction while the brake pad is prevented from moving along the Y-axis direction; and selectively moving the brake pad along the X-axis and Y-axis directions so as to form a second chamfer on a second end portion of the peripheral surface of the brake pad after the step of grinding the peripheral surface while the brake pad continues to move along the X-axis direction.

* * * * *

UNITED STATES PATENT AND TRADEMARK OFFICE
CERTIFICATE OF CORRECTION

PATENT NO. : 6,110,009
DATED : August 29, 2000
INVENTOR(S) : Yukio HAHIMOTO et al.

It is certified that error appears in the above-identified patent and that said Letters Patent is hereby corrected as shown below:

Claim 12, col. 10, line 27, "A method a" should read --A method of--.

Claim 18, col. 12, line 8, "A method a" should read --A method of--.

Signed and Sealed this

Twenty-ninth Day of May, 2001

*Attest:*

NICHOLAS P. GODICI

*Attesting Officer*   *Acting Director of the United States Patent and Trademark Office*